United States Patent [19]

Yoshikawa et al.

[11] Patent Number: 5,247,435
[45] Date of Patent: Sep. 21, 1993

[54] DATA CONTROL APPARATUS FOR MANAGING DATA POSSESSING TIME INFORMATION

[75] Inventors: Kaeko Yoshikawa, Nara; Kouji Inoue, Fukuyama, both of Japan

[73] Assignee: Sharp Kabushiki Kaisha, Osaka, Japan

[21] Appl. No.: 700,794

[22] Filed: May 16, 1991

[30] Foreign Application Priority Data

May 18, 1990 [JP] Japan ................. 2-129917

[51] Int. Cl.⁵ ........................... G06F 15/40
[52] U.S. Cl. ................................. 364/400
[58] Field of Search ............ 364/705.01, 705.06, 364/705.07, 705.08, 400, 419

[56] References Cited

U.S. PATENT DOCUMENTS 4,896,306  1/1990  Sanbongi et al. ............ 368/29

FOREIGN PATENT DOCUMENTS

62-109157  5/1987  Japan .
63-113664  5/1988  Japan .
2-232771   9/1990  Japan .

Primary Examiner—Thomas G. Black
Assistant Examiner—Michael Zanelli
Attorney, Agent, or Firm—Nixon & Vanderhye

[57] ABSTRACT

In the data control apparatus for managing data including the time information such as date, when the research period is set as the data retrieval condition, the data including the time information of the retrieval period is selected. The dates of the start point and end point of the research period in the data retrieval in the year unit are always the same, and the days of the start point and end point of the research period in the month unit are determined depending on each month. That is, in the data control apparatus of the invention, when only the year is entered when setting the research period, "January 1" and "December 31" are automatically set as the dates of the start point and end point. Or when the month and year are entered, the "first" and the "end day of that month" are automatically set as the days of the start point and end point. Therefore, the load of the operator for setting the research period may be alleviated.

10 Claims, 11 Drawing Sheets

| INPUT PORTION OF START POINT OR END POINT | UNENTERED PORTION | |
|---|---|---|
| | START POINT DATE | END POINT DATE |
| YEAR | JANUARY 1 | DECEMBER 31 |
| YEAR, MONTH | 1ST | END OF EACH MONTH |

31

Fig. 11A
```
FROM
 MONTH xx DAY xx, 1990
TILL
```
2

Fig. 11B
```
FROM
 JANUARY 1, 1990
TILL
 DECEMBER 31, 1990
```
2

Fig. 11C
```
FROM
 APRIL DAY xx, 1990
TILL
```
2

Fig. 11D
```
FROM
 APRIL 1, 1990
TILL
 APRIL 30, 1990
```
2

Fig. 11E
```
FROM
 APRIL 15, 1990
TILL
```
2

Fig. 11F
```
FROM
 APRIL 15, 1990
TILL
 APRIL 15, 1990
```
2

| INPUT PORTION | RESEARCH MODE | |
|---|---|---|
| | PRIOR | POSTERIOR |
| YEAR | DECEMBER 31 | JANUARY 1 |
| YEAR, MONTH | END OF EACH MONTH | 1ST OF EACH MONTH |

Fig. 15 A

BEFORE
   MONTH xx DAY xx, 1990 — 2

Fig. 15 B

BEFORE
   DECEMBER 31, 1990 — 2

Fig. 15 C

BEFORE
   APRIL DAY xx, 1990 — 2

Fig. 15 D

BEFORE
   APRIL 30, 1990 — 2

Fig. 16 A

AFTER
  MONTH xx DAY xx, 1990  —2

Fig. 16 B

AFTER
  JANUARY 1, 1990  —2

Fig. 16 C

AFTER
  APRIL DAY xx, 1990  —2

Fig. 16 D

AFTER
  APRIL 1, 1990  —2

DATA CONTROL APPARATUS FOR MANAGING DATA POSSESSING TIME INFORMATION

BACKGROUND OF THE INVENTION

1. Field of the Invention

The present invention relates to a data control apparatus, and more particularly to a data control apparatus for managing data possessing of time information.

2. Description of the Prior Art

In this specification, the time information denotes the information expressing part or the whole of the year, month, day and time, and the period means both a closed period determined by the start point and the end point, and an open period determined either by the start point or the end point.

The data control apparatus for managing the data possessing of time information such as year, month and day is known. In the conventional data control apparatus for managing the data possessing of year, month and day as the time information, when the date to determine the start point of the research period and the date to determine the end point of the research period are given by the operator as the data research conditions, the data having the accompanying date contained in the research period set by the operator is selected from among the data stored in the memory device of the apparatus.

In such data search using the data control apparatus, it is often required to search in the unit of year or the unit of month. For example, when searching the data in 1989, the start point of the research period to be set in January 1, 1989, and the end point of research period is December 31, 1989. In another example, when searching the data in April 1989, the start point of research period to be set is April 1, 1989, and the end point of research period is April 30, 1989.

As understood from these examples, in the data searching in the unit of year, the start point and end point of research period to be set are always the same. In the data searching in the unit of month, the start point and end point depend on each month.

In the conventional data control apparatus, when searching the data, it is always necessary to set both the start point and end point of the research period. Therefore, in the conventional data control apparatus, the input job for data retrieval is bothersome for the operator who searches in the year unit or month unit, and the retrieval work is time-consuming.

SUMMARY OF THE INVENTION

The invention is devised in the light of the above background, and it is an object thereof to present a data control apparatus capable of alleviating the load of the operator in the setting operation of the research period for data retrieval.

To achieve the above object, the invention presents a data control apparatus which comprises means for storing data including the time information, and means for searching data stored in the storing means on the basis of the comparison between the research period determined at least by either one of the start point and end point and the corresponding time information, wherein the searching means comprises means for setting the remaining portion by a specific rule when a part of the information determining the research period is set by the operator.

When a part of the information for determining the research period is set by the operator, the remaining portion is set by the setting means by a specific rule, and according to the research period set in this way, the data in the storing means is searched by the searching means.

The invention therefore presents a data control apparatus capable of alleviating the load of the operator in setting of the research period for data retrieval, and enhancing the efficiency of data retrieval work.

The invention also presents a data control apparatus having means for storing the data including the time information, means for searching the data corresponding to the time information contained in the research period, by comparing the research period determined at least by either the start point or end point, with the time information, and means for entering the period information for setting the research period, wherein the searching means comprises means for setting the period information of the remaining portion according to a predetermined procedure, when a part of the period information is entered by the entering means.

In the invention, the searching means executes the period searching on the basis of the research period determined by the entered start point and end point, the prior searching on the basis of the research period determined by the entered end point, and the posterior searching on the basis of the research period determined by the entered start point.

In the invention, moreover, the setting means comprises setting means for period searching, setting means for prior searching, and setting means for posterior searching.

In the invention, the time information consists of year information, month information, and day information.

In the invention, the setting means for period searching sets the research period according to the stored information by storing the start point information "January 1" and end point information "December 31" which are referred to when the entered period information is the year information, and the start point information "1st" and the end point information which are referred to when the entered period information is the year-month information.

In the invention, the setting means for prior searching sets the research period according to the stored information by storing the end point information "December 31" which is referred to when the entered period information is the year information, and the end point information which is referred to when the entered period information is the year-month information.

In the invention, the setting means for posterior searching sets the research period according to the stored information by storing the start point information "January 1" which is referred to when the entered period information is the year information, and the start point information "1st" which is referred to when the entered period information is the year-month information.

In the invention, when the entered period information is the year-month information and when the month is February, it is judged whether it is a leap year or not according to the year information, and the end point information is set as "29th" when it is a leap year, and as "28th" otherwise.

In the invention, the period information includes the hour information, minute information and second information.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawing, preferred embodiment of the invention are described below.

Figure 1:
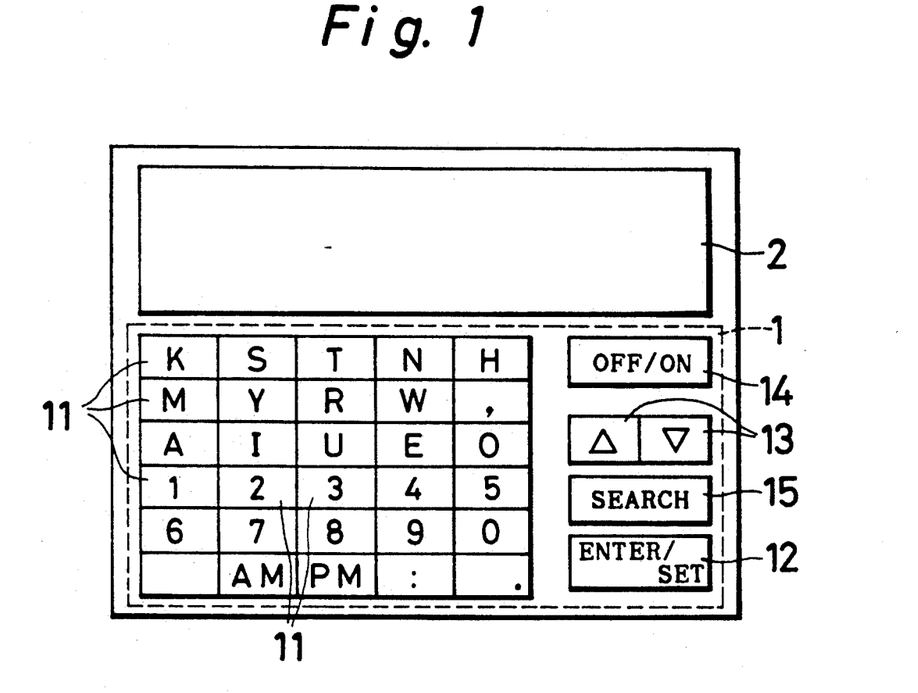
FIG. 1 is a plan view showing the appearance of an embodiment of the invention.

FIG. 1 is a plan view of the appearance of an embodiment of the invention. As shown in FIG. 1, this embodiment comprises a keyboard 1 used in input of data and others, and a liquid crystal display (LCD) 2 for dot matrix display of characters and graphics.

The keyboard 1 comprises keys 11 for entering data composed of alphabetic letters, numerals and others, an enter/set key 12 for finishing the data input, cursor keys 13 for moving the display content on the LCD 2 and changing the data input position on the LCD 2, power key 14 for turning on and off the power, and a search key 15 for executing data retrieval.

In this embodiment, as the time information, the data containing the date information (year, month, day) can be entered and stored. By the data retrieval function, the stored data is searched on the basis of the comparison between the research period set by the operator, and the date information of the stored data. In data retrieval, as mentioned later, for example when searching in the year unit, the operator is not required to set the dates for determining the research period completely, and the remaining portion of the date that is not set is automatically set according to a specific rule.

Figure 2:
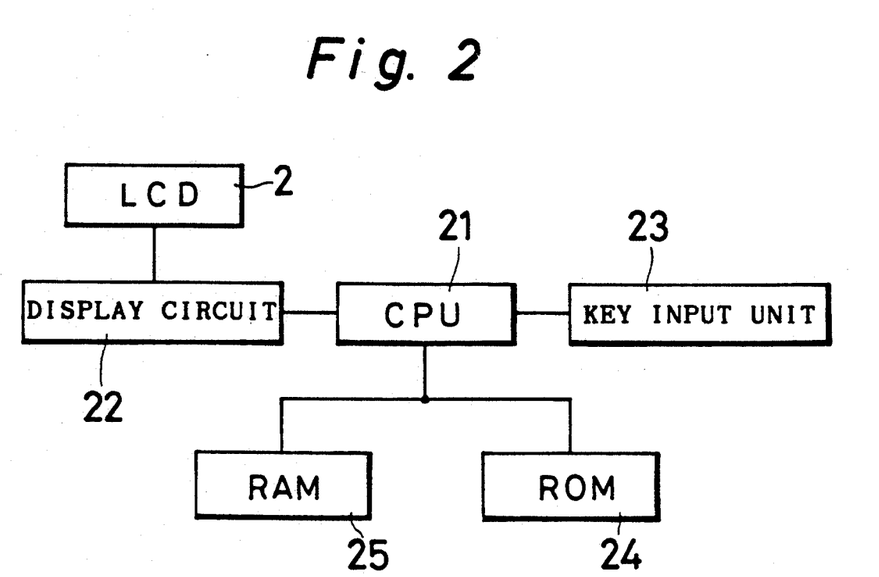
FIG. 2 is a block diagram showing a hardware structure of the same embodiment.

A hardware configuration of this embodiment is shown in FIG. 2. The input and output operations in this embodiment are controlled by a CPU 21. The LCD 2 is connected to the CPU 21 through a display circuit 22, and according to the control signal from the CPU 21, it is driven by the display circuit 22. The key input unit 23 connected to the CPU 21 is a circuit for detecting the key inputs from the keyboard 1. The key inputs detected by the key input unit 23 are processed by the CPU 21.

The CPU 21 is further connected to a ROM 24 and a RAM 25. The ROM 24 stores the control program for operating the CPU 21, table for containing the data for automatic setting of the date, and others. The RAM 25 stores the data possessing the date information entered through the keyboard 1, and also possesses memory areas for input buffer and others.

Figure 3:
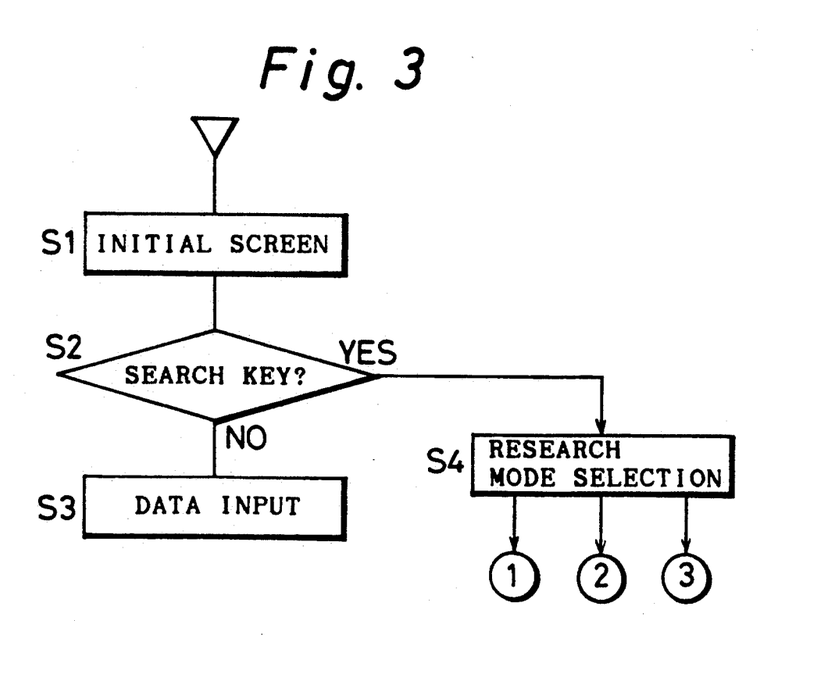
FIG. 3 to FIG. 6 are flow charts for explaining the operation of the same embodiment.
Figure 7:
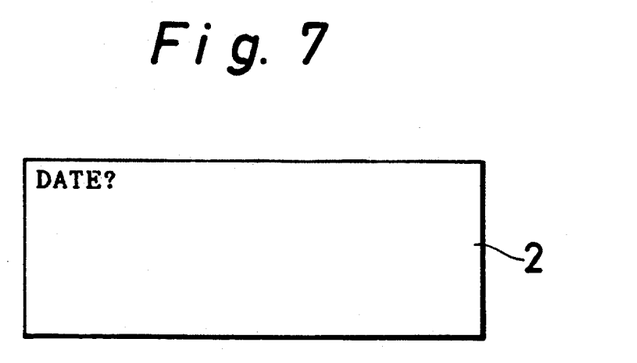
FIG. 7 is a diagram showing an initial screen of the same embodiment.

The operation of this embodiment is described below. In the first place, when the power is turned on by the power key 14, the LCD 2 shows the initial screen as shown in FIG. 7 at step S1 in FIG. 3. This initial screen urges input of the date corresponding to the date to be entered. At step S2, it is judged whether search key 15 has been pressed or not, and when the search key 15 has been pressed, the operation advances to step S4, and when other key has been pressed, the operation goes to step S3 for data input. At step S3, the operator enters the date, and then enters the data corresponding to the date. The entered data is stored in the RAM 25 together with the date.

Figure 8:
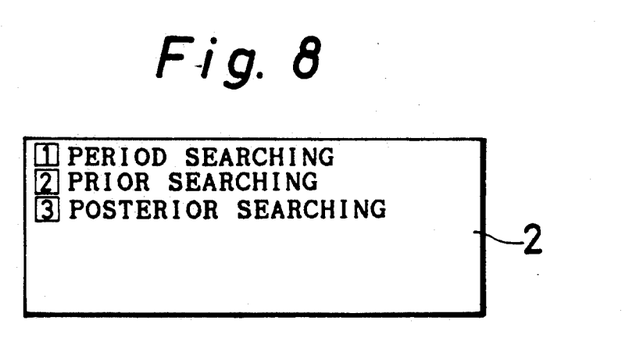
FIG. 8 is a diagram showing a screen for research mode selection of the same embodiment.

At step S4, as shown in FIG. 8, the display is made for selecting the research mode in data retrieval. When [1] key 11 is pressed to select the "period searching", the operation advances to step S10 in FIG. 4. When [2] key 11 is pressed to select the "prior searching", the operation goes to step S40 in FIG. 5, or when [3] key 11 is pressed to select the "posterior searching", the operation skips to step S60 in FIG. 6.

As mentioned below, depending on the selected research mode, the setting method of the period which is the retrieval condition varies. In the research mode of "period searching", as the research condition, both the start point and end point of the research period must be entered. In this research mode, the data on and after the start point date and on and before the end point date are searched. In the research mode of "prior searching", only the end point of the research period is required. In this research mode, the data on and before the given end point date are searched. In the research mode of "posterior searching", only the start point of the research period is required, and in this research mode, the data on and after the given start point data are searched.

The retrieval mode of "period searching" is described in detail below. The automatic setting of the dates in the research mode of "period searching" is done by referring to the table 31 in the ROM 24 schematically shown in FIG. 10. The table 31 stores the start point data "January 1" and the end point date "December 31" which are referred to when only the year of the start point and end point dates of the research period is entered. In this embodiment, however, since the completion of the input of the start point date is followed by the input of the end point date, only when the year of the end point is entered, only the end point date "December 31" is referred to.

Figure 10:
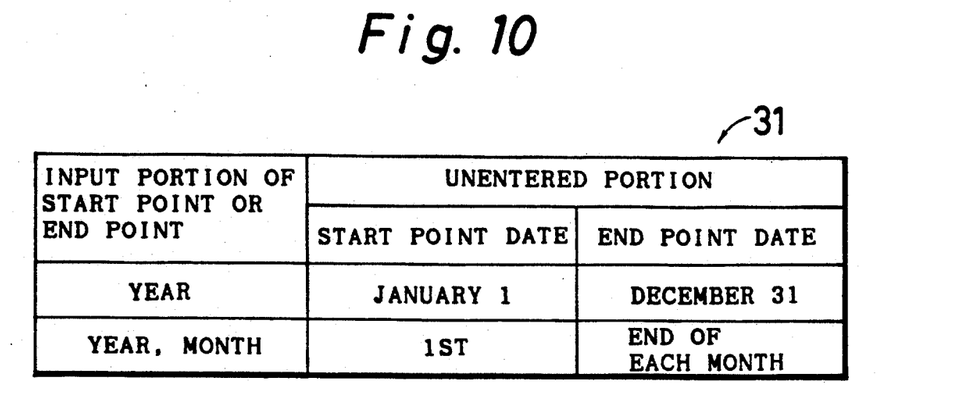
FIG. 10 is a schematic diagram of a table used in the research mode of "period searching,"

The table 31 also stores the start point date "1st" and the end point date (the final day of each month) which are referred to when the year and month of the start point or end point date of the research period are entered. In automatic date setting, however, when the end of Febuary is required, since the final day of Febuary differs whether it is leap year or not, it is calculated. Instead of holding the date for automatic setting in a form of table as in this embodiment, it is also possible to determine by calculation in the program.

Figure 4:
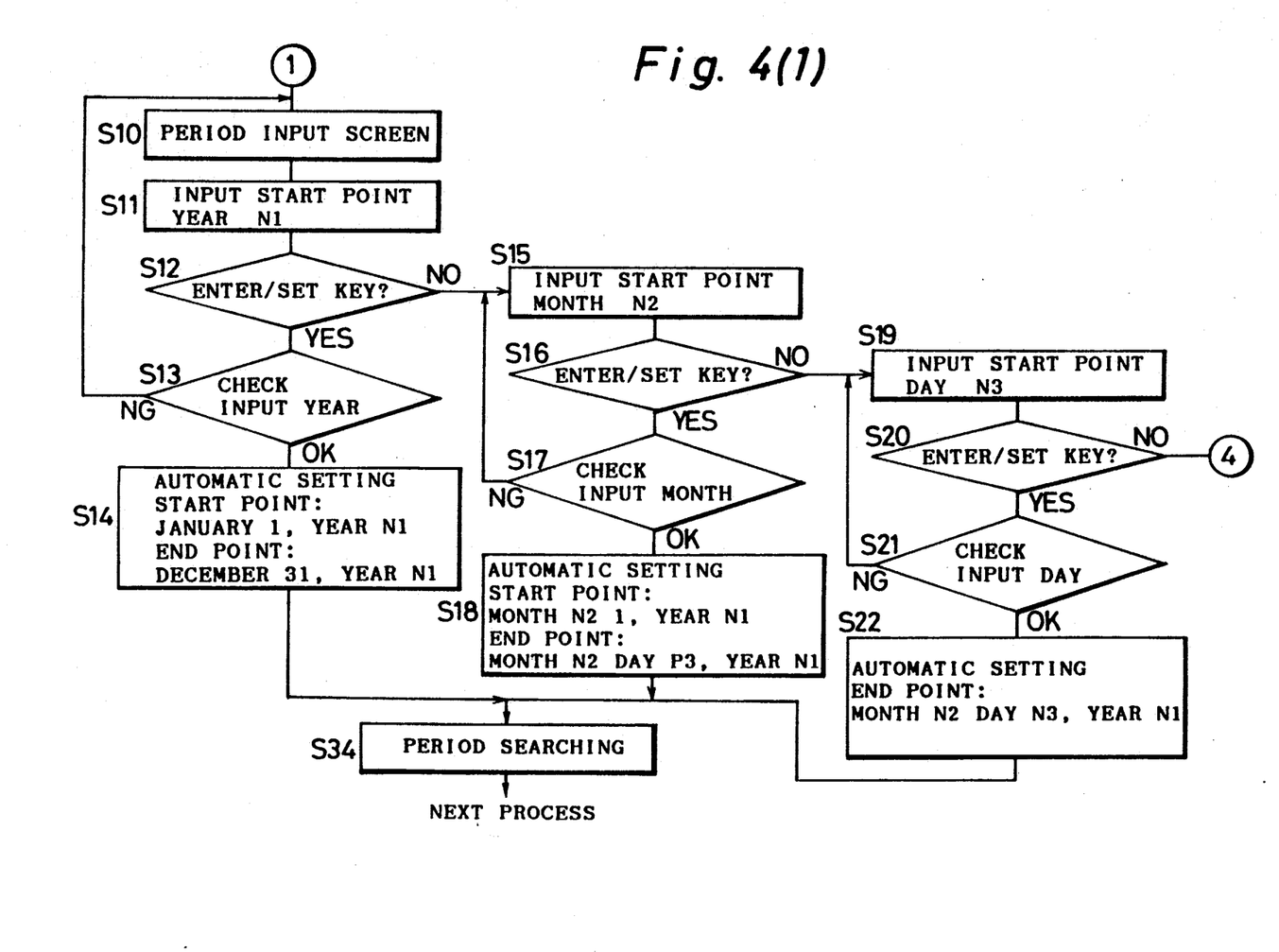
Figure 9:
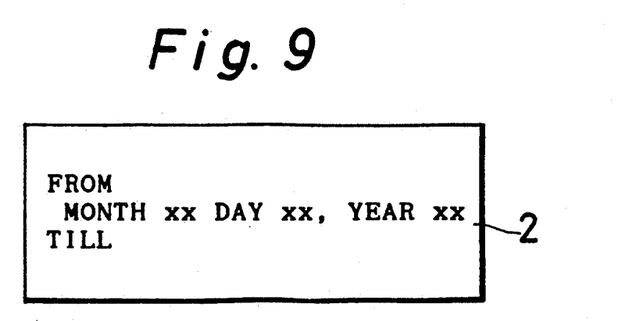
FIG. 9 is a diagram showing a screen for research period input in the research mode of "period searching" of the same embodiment.

In the research mode of "period searching", first, at step S10 in FIG. 4, the display appears to urge to enter the research period as shown in FIG. 9. At step S11, the year of the start point date is entered. In this embodiment, meanwhile, the year is specified in four digits (Christian Era). Next, a step 12, it is judged whether the enter key 12 been pressed or not, and when judged that the enter key 12 has been pressed, the operation advances to step S13. At step S13, it is judged if the characters (the input year) in the input buffer in the RAM 25 are four characters or not, and if less than four characters, the operation returns to step S10 to enter the year again.

Figure 11:
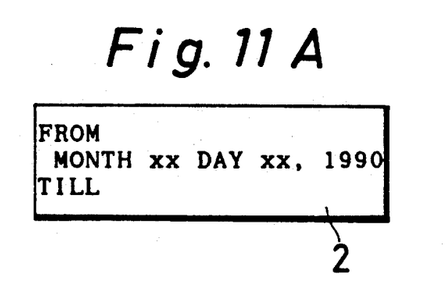
FIG. 11A to FIG. 11F are diagrams showing examples of display screen in the research mode of "period searching,"

When the characters in the input buffer are four characters, referring to the table 31 in FIG. 10, the unentered portion of the date is set automatically (step S14), and the operation advances to the data retrieval step (step S34). At step S14, supporting the year entered by the operator to be N1, the start point date is automatically set as January 1, year N1, and the end point date as December 31, year N1. For Example, as the start point date, if only "1990" is entered as shown in FIG. 11A and then the enter/set key 12 is pressed, the unentered portion is automatically set as shown in FIG. 11B.

When a key other than the enter/set key 12 is pressed at step S12, the operation goes to step S15, where the month of the start point date is entered. Next, at step S16, when the enter/set key 12 is pressed, the operation goes to step S17, but other key is pressed, the operation skips to step S19. At step S17, it is checked whether the entered month (supposing it to be N2) is within "01" to "12", and if within this range, the unentered portion of the date is set automatically by referring to the table 31 in FIG. 10 (step S18), thereby advancing to the data retrieval step (step S34).

At step S18, the start point date is automatically set as the first day of month N2 of year N1, and the end point date as day P3 (P3 is the end day of month N2) of month N2 of year N1. For example, as the start point date, if only "April 1990" is entered as shown in FIG. 11C and then the enter/set key 12 is pressed, the unentered portion is set automatically as shown in FIG. 11D.

Steps S19 to S22 are in the same loop structure as steps S15 to S18, but these are steps for automatically setting the end point date, as well as input of the start point date. As step S21, it is checked whether the entered day (supposing to be N3) is within a range of "01" to "31". At step S22, the end point date is set automatically same as the start point date (day N3 of month N2 of year N1). For example, as the start point date, if "Apr. 15, 1990" is entered as shown in FIG. 11E and the enter key 12 is pressed, the date of the end point is automatically set as shown in FIG. 11F.

Steps S23 to S26 are in the same loop structure as steps S15 to S18, but these are steps for input of the year of the end point date, and automatic setting of the unentered portion. The checking procedure of the input year (supposing to be N4) at step S25 is same as that at step S13. At step S26, the end point date of automatically set on December 31, year N4.

Steps S27 to S30 are in the same loop structure as steps S15 to S18, but these are steps for input of the month of the end point date, and automatic setting of the unentered portion. The checking procedure of the input month (supposing to be N5) at step S29 is same as that in step S17. At step S30, the end point date is automatically set on day P6 (P6 is the end day of month N5) of month N5 of year N4.

Steps S31 to S33 are for the input of the day of the end point date. The checking procedure of the input day (supposing to be N6) at step S33 is same as that in step S21. The end point date is day N6 of month N5 of year N4.

The research mode of "prior searching" and "posterior searching" is similarly described below.

Figure 14:
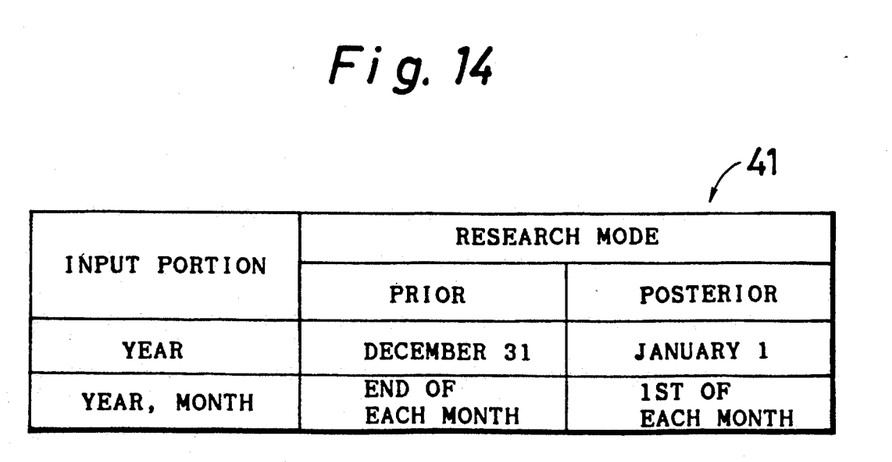
FIG. 14 is a schematic diagram of a table used in the research mode of "prior searching" and "posterior searching,"

Automatic setting of the unentered portion of the date in the research mode of "prior searching" and "posterior searching" is done by referring to the table 41 in the ROM 24 shown schematically in FIG. 14. The table 41 stores, as the data for "prior searching", the date "December 31" which is referred to when only the year of the end point date of the research period is entered, and the date (the end day of each month) which is referred to when the year and month of the end point date of the research period are entered. The table 41 also stores, as the data for the research mode of "posterior searching", the date "January 1" which is referred to when only the year of the start point date of the research period is entered, and the date "first" which is is referred to when the year and mouth of the start point date of the research period are entered.

The end day of February differs whether it is a leap year or not, and at the time of automatic setting, the table 41 is not referred to, but it is determined by calculation. Or, instead of holding the date for automatic setting in a form of the table as in this embodiment, it is also possible to determine by calculation in the program.

Figure 5:
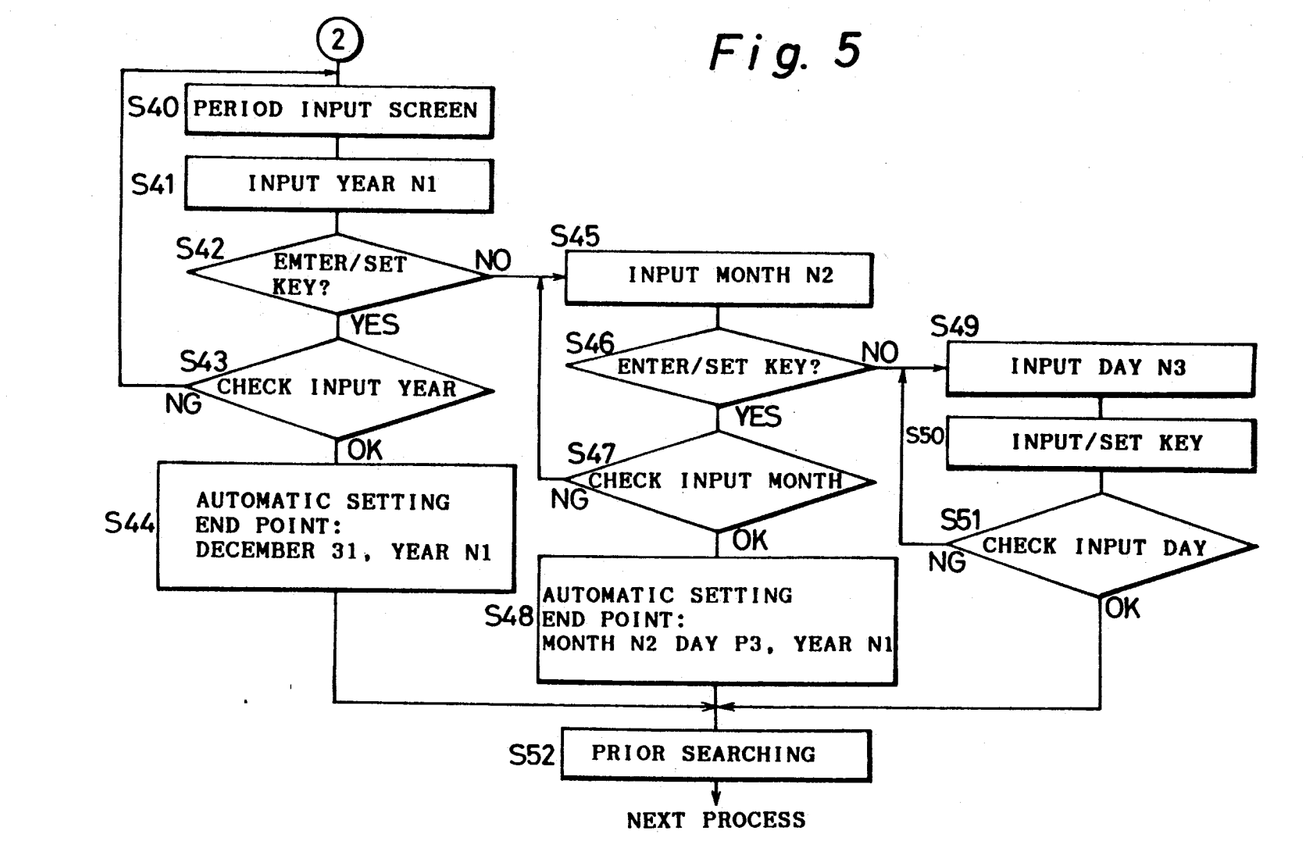
Figure 12:
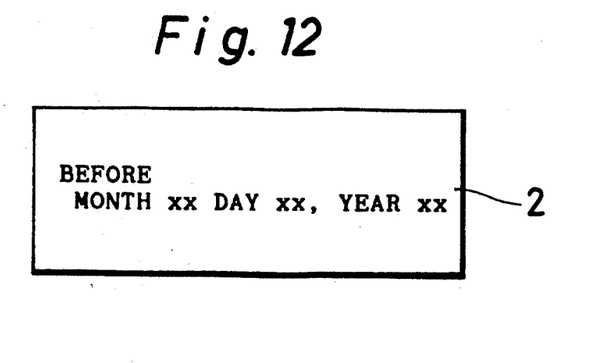
FIG. 12 is a diagram showing a screen for research period input in the research mode of "prior searching,"

In the research mode of "prior searching", first at step S40 in FIG. 5, the display appears to urge to enter the end point date of the research period as shown in FIG. 12. At step S41, the year of the date is entered. A step S42, it is judged whether the enter/set key 12 has been pressed or not, and if judged to be pressed, the operation goes to step S43. At step S43, the input year (supposing to be N1) is checked in the same procedure as at step S13 (FIG. 4), and if checking is not satisfied, the operation returns to step S40, where the year is entered again.

Figure 15A:
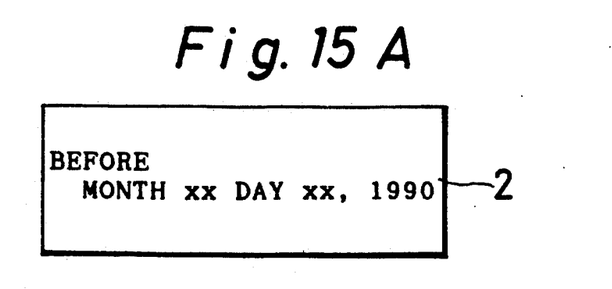
FIG. 15A to FIG. 15D are diagrams showing examples of display screen in the research mode of "prior searching.
Figure 15B:
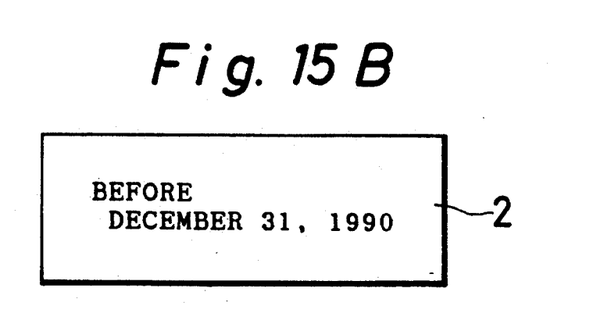

When checking is satisfied, by referring to the table in FIG. 14, the unentered portion of the date is set automatically (step S44), and the operation advances to data retrieval step (step S52). At step S44, the date is automatically set on December 31, year N1. For example, as the date, if only the year "1990" is entered as shown in FIG. 15A and the enter key 12 is pressed, the unentered month and day are automatically set as shown in FIG. 15B.

When other key than the enter/set key 12 is pressed at step S42, the operation advances to step S45, and the month of the date is entered. Next, at step S45, when the enter/set key 12 is pressed, the operation advances to step S47, but when other key is pressed, the operation skips to step S49. At step S47, the entered month (supposed to be N2) is checked in the same procedure at a steps S17 (FIG. 4). When checking is satisfied, referring to the table 41 in FIG. 14, the unentered portion of the date is set automatically (step S48), thereby advancing to the data retrieval step (Step S52).

Figure 15C:
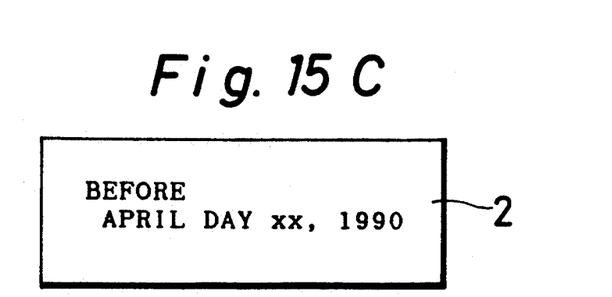
Figure 15D:
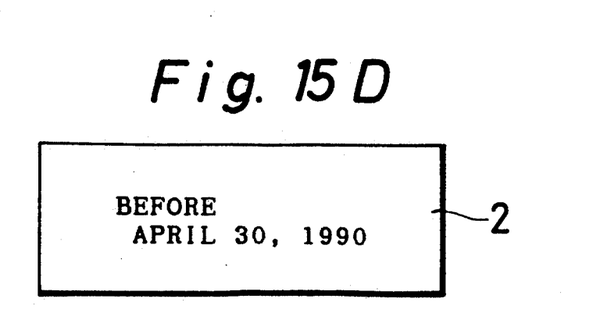

At step S48, the date is set on day P3 of month N2 of year N1 (P3 is the end day of month N2). For example, as the date, when only "April 1990" is entered as shown in FIG. 15C and the enter/set 12 is pressed, the unentered day is automatically set as shown is FIG. 15D.

Steps S49 to S51 are steps for input of the day of the date. At step S51, it is checked if the input day (supposed to be N3) is within a range of "01" to "31". The input date may be expressed as day N3 of month N2 of year N1.

Figure 6:
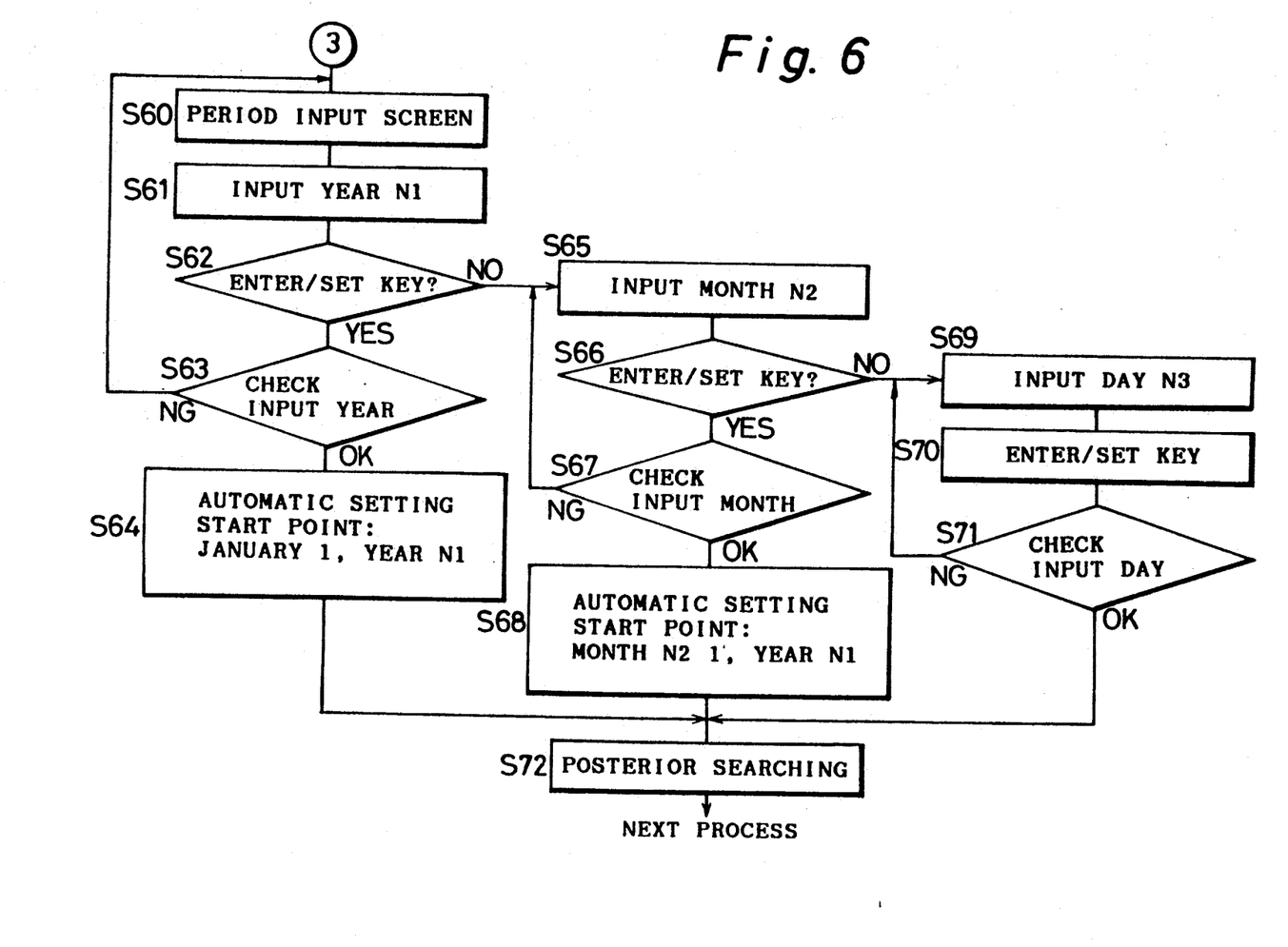
Figure 13:
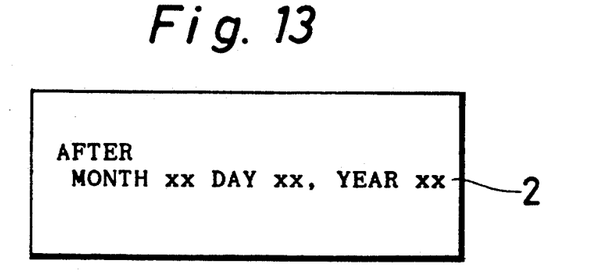
FIG. 13 is a diagram showing a screen for research period input in the research mode of "posterior searching" in the same embodiment.

In the research mode of "posterior searching", first at step S60 in FIG. 6, the display appears to urge to enter the date as the start point of the research period as shown in FIG. 13. At step S61, the year of the date is entered. Next, at step S62, it is judged whether the enter/set key 12 is pressed or not, and if judged to be pressed, the operation advances to step S63. The checking procedure of the input year at step S63 is same as at step S13 (FIG. 4). If the input year does not satisfy the checking at step S63, the operation returns to step S60, where the year is entered again.

Figure 16:
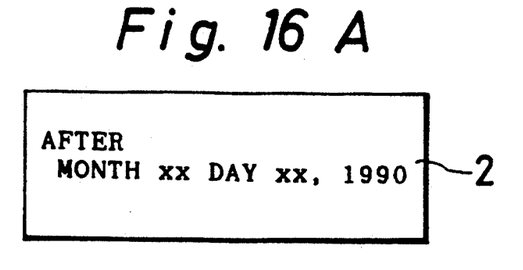
" and FIG. 16A to FIG. 16D are diagram showing examples of display screen in the research mode of "posterior searching."

At step S64, referring to the table 41 in FIG. 14, the unentered portion of the date is set automatically, and the data is searched at step S72. At step S64, supposing the input year to be N1, the date is set on January 1, year N1. For example, as the date, if only the year "1990" is entered as shown in FIG. 16A and the enter/set key 12 is pressed, the unentered month and day are set automatically as shown in FIG. 16B.

At step S62, when other key than the enter/set key 12 is pressed, the operation advances to step S65. Next, at step S66, when the enter/set key 12 is pressed, the operation goes to step S67, but when other key is pressed, the operation skips to step S69. At step S67, the input month (supposed to be N2) is checked in the same procedure as at step S17 (FIG. 4), and the unentered portion of the date is set automatically at step S68.

At step S68, the date is set on the first day of month N2 of year N1. For example, if only "April 1990" is entered as the date as shown in FIG. 16C and the enter/set key 12 is pressed, the unentered date is automatically set as shown in FIG. 16D.

Steps S69 to S71 are the steps for input of the day of the date. Step S71 is for checking the input day (supposing to be N3) in the same procedure as at step S21 (FIG. 4). The input date may be expressed as day N3 of month N2 of year N1.

In the research mode of "period searching" in the foregoing embodiment, various modifications are possible within the scope of the invention. For example, when a part of the date of the start point (say, the year only) is entered, the date of the end point may be set freely. In this modification, after the input of the year of the start point date or the year and month, when the cursor key 13 is pressed, the unentered portion of the start point date is automatically set, thereby transferring to the input of the end point date. If there is an unentered portion in the end point date at the end of the input of the end point date, that portion is set automatically.

As an example of start point date, if only the year "1989" is entered, the start point date is automatically set On Jan. 1, 1989. Afterwards as the end point date, if only the year "1990" is entered, the end point date is automatically set on Dec. 31, 1990. It is also possible that the operator can enter the month and day of the end point date.

In the above embodiment, the period information of the data was only the year, month and day, but in the scope of the invention, the period information also includes the time (hour, minute, second, etc.), and the time can be specified as the retrieval condition of the data.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A data control apparatus comprising:
   means for storing data including corresponding time information,
   means for entering all or part of period information determining a research period, said information including a period start point and/or an end point,
   means for searching the data stored in the storing means on the basis of a comparison between the research period determined at least by either one of an entered start point or an entered end point and the corresponding stored time information,
   said searching means including means responsive to the means for entering for setting a remaining portion of said research period by a specific rule when only a part of the information determining the research period is entered by the operator.

2. A data control apparatus comprising:
   means for storing data including corresponding time information,
   means for entering control signals and time period information related to a research time period, said time period information including at least the research time period start point or the research time period stop point,
   search means responsive to said means for entering for searching for stored data corresponding to the time information within a research time period by comparing the research time period with the stored time information,
   said search means including means for automatically setting said research time period in accordance with a predetermined procedure in response to said control signals and said time period information from the means for entering,
   whereby said search means is enabled to search within a research period beginning with said start point, a research period ending with said stop point or a research period between said start point and said stop point.

3. The data control apparatus of claim 1 or 2, wherein the searching means executes:
   period searching on the basis of a research period determined by the entered start point and end point,
   prior searching on the basis of a research period determined by the entered end point, and
   posterior searching on the basis of a research period determined by the entered start point.

4. The data control apparatus of claim 3, wherein the setting means comprising:
   means for selecting period searching,
   means for selecting prior searching, and
   means for selecting posterior searching.

5. The data control apparatus of claim 1 or 2, wherein the time information includes year information, month information and day information.

6. The data control apparatus of claim 4, wherein the means for selecting period searching sets the research period for the stored information by storing the start point information "January 1" and end point information "December 31" for the research period when the entered period information is only the year information, and the start point information "1st" and the end point information pertaining to a selected month for the research period when the entered period information is only the year-month information.

7. The data control apparatus of claim 6, wherein when the entered period information is the month information and when the month is "February", it is judged whether it is a leap year or not according to the year information, and the end point information is set as "29th" when it is a leap year, and as "28th" otherwise.

8. The data control apparatus of claim 4, wherein the means for selecting prior searching sets the research period for the stored information by storing the end point information "December 31" for the research period when the entered period information is only the year information, and the end point information pertaining to a selected month for the research period when the entered period information is only the year-month information.

9. The data control apparatus of claim 4, wherein the means for selecting posterior searching sets the research period for the stored information by storing the start point information "January 1" for the research period when the entered period information is only the year information, and the start point information "1st" for the research period when the entered period information is only the year-month information.

10. The data control apparatus of claim 5, wherein the period information includes hour information, minute information and second information.

* * * * *